(12) United States Patent
Watanabe

(10) Patent No.: US 7,103,268 B2
(45) Date of Patent: Sep. 5, 2006

(54) OPTICAL DISK REPRODUCER

(75) Inventor: Toshiyuki Watanabe, Ikoma (JP)

(73) Assignees: Sanyo Electric Co., Ltd., Moriguchi (JP); Sanyo Technosound Co., Ltd., Daito (JP)

(*) Notice: Subject to any disclaimer, the term of this patent is extended or adjusted under 35 U.S.C. 154(b) by 1132 days.

(21) Appl. No.: 09/995,577

(22) Filed: Nov. 29, 2001

(65) Prior Publication Data

US 2002/0067667 A1 Jun. 6, 2002

(30) Foreign Application Priority Data

Dec. 1, 2000 (JP) ............................. 2000-366513

(51) Int. Cl.
*H04N 5/85* (2006.01)
(52) U.S. Cl. .................. 386/125; 386/126; 386/68; 386/70; 386/45; 386/46
(58) Field of Classification Search ........ 386/125–126, 386/68, 70, 45, 46
See application file for complete search history.

(56) References Cited

U.S. PATENT DOCUMENTS 6,320,826 B1 * 11/2001 Willis et al. ............... 369/30.1
2002/0065969 A1 * 5/2002 Schultz ....................... 710/260

FOREIGN PATENT DOCUMENTS

JP        10-322661 A      12/1998

* cited by examiner

*Primary Examiner*—Thai Tran
*Assistant Examiner*—Helen Shibru

(74) *Attorney, Agent, or Firm*—Westerman, Hattori, Daniels & Adrian, LLP.

(57) ABSTRACT

The number of sectors which are NV_PCK in an ECC block is detected by a number-of-sectors detection circuit 12, and a control circuit 14 considers, when the detected number of sectors is larger than a predetermined value, that NV_PCK reference processing is not terminated within a time period during which the subsequent ECC block is buffered, to suspend the buffering of the subsequent ECC block.

8 Claims, 4 Drawing Sheets

FIG. 4

| SECTOR | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLAG | 0 | 1 | 1 | 0 | 1 | 0 | 1 | 0 | 0 | 1 | 0 | 1 | 1 | 1 | 1 | 1 |

OPTICAL DISK REPRODUCER

BACKGROUND OF THE INVENTION

1. Field of the Invention

The present invention relates generally to an optical disk reproducer for reproducing video and audio information, for example, recorded on an optical disk, and more particularly, to an optical disk device for carrying out reproduction control on the basis of navigation data recorded in the optical disk.

2. Description of the Prior Art

Optical disk reproducers using an optical disk as a recording medium for reproducing digitized information such as audio, video, image, and character information which are recorded on the optical disk has been conventionally put to practical use. One of them is a DAD (Digital Versatile Disc) video player.

In the DAD, navigation data which are reproduction control data for designating the order of reproduction and branching of presentation data stored in a divisional manner in the DAD are recorded in addition to presentation data such as video data, audio data, and data related to a sub-picture (e.g., subtitles) which are main objects of reproducing a movie or the like.

One of the navigation data in the DAD is a data unit referred to as NV_PCK (a navigation pack). The NV_PCK, together with V_PCK (a video pack) on which video data which is presentation data is recorded, A_PACK (an audio pack) on which audio data which is presentation data is recorded, SP_PACK (a sub-picture pack) on which sub-picture data which is presentation data is recorded, constitutes a data unit referred to as a VOBU (Video Object Unit).

On NV_PCK, attributes for controlling the reproduction of a VOBU having the NV_PCK recorded thereon and data used for search and seamless reproduction (such reproduction that video is not intermittent) are recorded. At the time of special reproduction such as fast forward reproduction and backward reproduction of video, for example, reproduction control (seek, buffering, or decoding) is carried out while obtaining an address representing a VOBU to be subsequently reproduced while referring to the NV_PCK (see JP-A-10-322661, for example).

Meanwhile, the data read out of the optical disk such as the DVD is buffered in a memory (stored in a memory) after being subjected to demodulation corresponding to 8/16 modulation. By a DVD decoder, the data is subjected to error correction processing in units of ECC (Error Correcting Code) blocks and is then subjected to error detection processing by an EDC (Error Detection Code). After the error detection processing is performed, NV_PCK reference processing is performed.

In the DVD, the ECC block is composed of 16 sectors, one of the packs, i.e., NV_PCK, V_PCK, and A_PCK corresponds to one sector. Accordingly, a maximum of 16 packs NV_PCK may be included in one ECC block. The head of each of the sectors (16 sectors) in the ECC block is provided with a system header indicating what data is the sector.

The NV_PCK reference processing is performed by first reading the system header attached to the head of each of the sectors (16 sectors) in the ECC block to refer to and detect the NV_PCK, accessing the memory storing the ECC block decoded (which has been subjected to ECC and EDC processing) on the basis of the results of the detection to read out necessary navigation data (data representing the NV_PCK).

As described above, the ECC processing (error correction processing), the EDC processing (error detection processing), and the NV_PCK reference processing in the decoding processing are performed in units of ECC blocks by the DVD decoder. In order to increase the speed and the efficiency of the decoding processing, the buffering, the ECC processing, the EDC processing, and the NV_PCK reference processing of the data read out of the optical disk are performed using pipeline processing having the ECC block as a unit, so that the decoding processing in VOBU units is performed. FIG. 2 shows how the decoding processing is performed.

For example, the m-th ECC block is read out, and is buffered in the memory through demodulation corresponding to 8/16 modulation. When the buffering is terminated, ECC and EDC processing of the m-th ECC block is performed and at the same time, buffering of the (m+1)-th ECC block is started.

When the ECC and EDC processing of the m-th ECC block is terminated, reference processing of NV_PCK in the m-th ECC block is performed, and the results of the processing are outputted at the timing when ECC and EDC processing of the subsequent ECC block is terminated (or NV_PCK reference processing is started). That is, in order to continue to continuously perform such pipeline processing, the NV_PCK reference processing must be completed before the ECC and EDC processing of the subsequent ECC block is terminated (before the NV_PCK reference processing is started). Consequently, a time period allowed for the NV_PCK reference processing is determined by a time period required for the buffering (time periods A and B are approximately equal in FIG. 2).

In a case where a lot of (a maximum of 16) packs NV_PCK are included in one ECC block and a case where the processing speed of a control circuit for performing NV_PCK reference processing is low, however, the NV_PCK reference processing may not be completed before ECC and EDC processing corresponding to the subsequent ECC block is terminated.

For example, when reference processing of NV_PCK in the (m+1)-th ECC block shown in FIG. 2 is not completed before ECC and EDC processing of the (m+2)-th ECC block is terminated, as indicated by a broken line, the reference processing of NV_PCK in the (m+1)-th ECC block is not completed before the timing when the results of the NV_PCK reference processing are outputted, and reference processing of NV_PCK in the (m+2)-th ECC block cannot be also performed.

The reference processing of NV_PCK in the (m+1)-th ECC block is delayed, so that processing in VOBU units cannot be performed, thereby fracturing reproduction control in VOBU units. Accordingly, reproduction such as fast forward reproduction may be delayed. If used as a control circuit (a microcomputer) for performing NV_PCK reference processing is one having a sufficiently high processing speed, the above-mentioned problem can be avoided. However, the control circuit having a high processing speed is higher in cost than a control circuit having a low processing speed, thereby increasing the cost of the device.

SUMMARY OF THE INVENTION

The present invention has been made in view of such points, and has for its object to provide an optical disk reproducer capable of completing, even in a case where reference processing of NV_PCK in an ECC block is not terminated within a predetermined time period such as a time period required for buffering, the reference processing of NV_PCK in the ECC block before ECC and EDC processing of the subsequent ECC block is terminated as well as performing reference processing of NV_PCK in a VOBU (ECC block) subsequently to processing of the previous VOBU (ECC block), and capable of performing DVD decoding reproduction which is synchronized with VOBU processing.

In an optical disk reproducer, comprising read-out means for reading out, from an optical disk having presentation data and navigation data recorded thereon, the recorded data, a memory storing the data read out by the read-out means, and decoding means for decoding the data stored in the memory in a predetermined unit, for performing reproduction based on the presentation data, an optical disk reproducer according to the present invention is characterized by comprising number-of-sectors detection means for detecting the number of sectors which are the navigation data included in the data in the predetermined unit stored in the memory; and control means for suspending, when the number of sectors detected by the number-of-sectors detection means is larger than a predetermined value, an operation for storing in the memory data in the subsequent predetermined unit.

An example of the control means is one for suspending the read-out from the optical disk by the read-out means and back-jumping a track position on the optical disk, to suspend an operation for storing in the memory the data in the predetermined unit.

An example of the decoding means is one comprising navigation sector detection means for detecting the navigation data included in the data in the predetermined unit stored in the memory, to specify which of the sectors is the navigation data. An example of the number-of-sectors detection means is one for counting the number of sectors which are the navigation data specified by the navigation sector detection means.

An example of the optical disk is one conforming to a DVD standard. In this case, the navigation data is NV_PCK.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic view showing an example of the results of NV_PCK detection according to an embodiment of the present invention.

DESCRIPTION OF THE PREFERRED EMBODIMENTS

Figure 1:
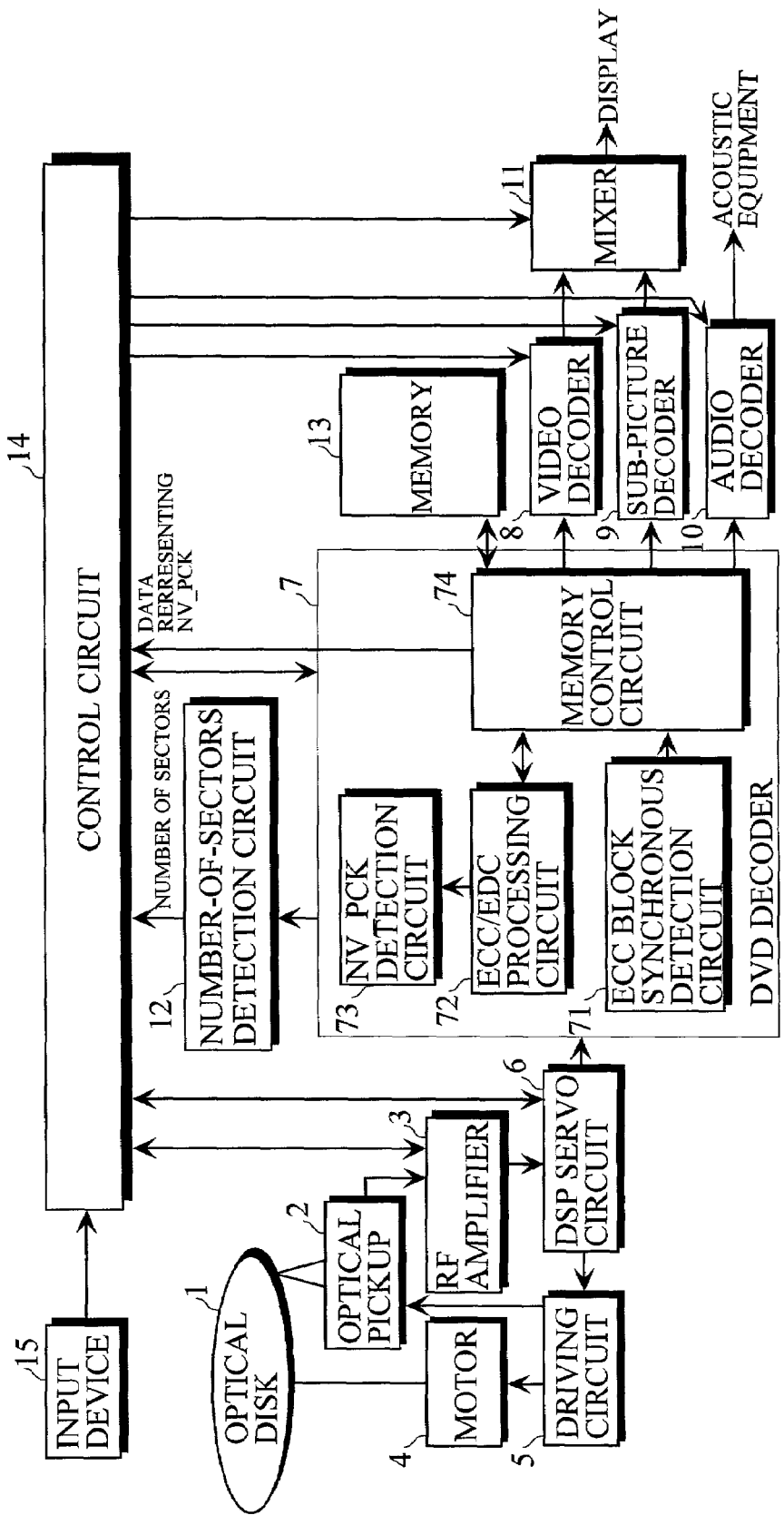
FIG. 1 is a block diagram showing the schematic configuration of an optical disk reproducer according to an embodiment of the present invention.
Figure 2:
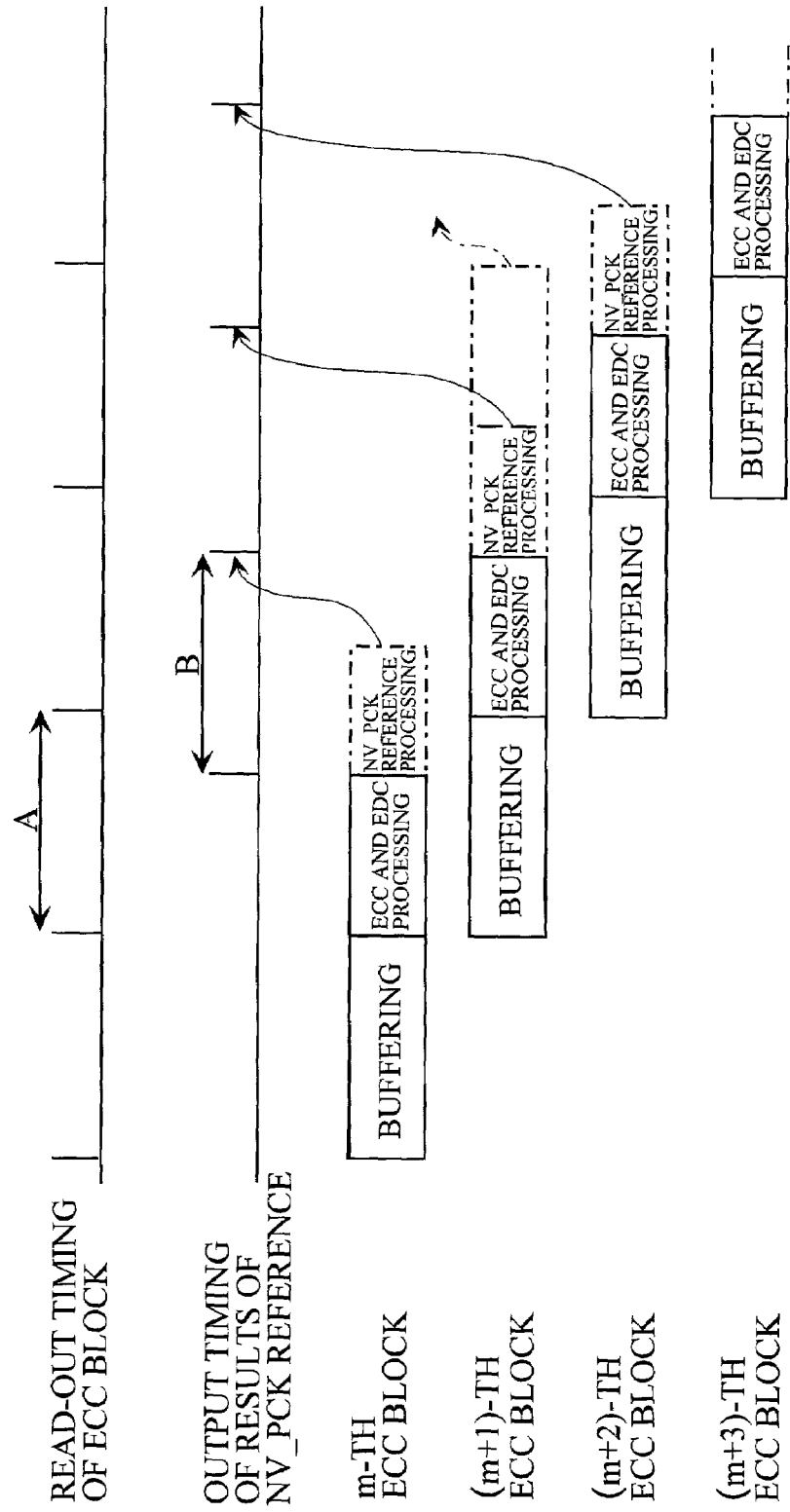
FIG. 2 is a timing chart for explaining conventional decoding processing.

FIG. 1 illustrates the schematic configuration of an optical disk reproducer according to an embodiment of the present invention. In this embodiment, an example of an optical disk serving as a recording medium is one conforming to a DVD standard.

Reference numeral 1 denotes an optical disk (DVD) serving as a recording medium, on which presentation data comprising data related to a program including video data and audio data which are main objects of reproducing a movie or the like and navigation data comprising control data, attribute data, and so forth related to reproduction control of the program are compressed and are recorded as a bit stream.

As described above, on each VOBU, presentation data, for example, V_PCK on which video data is recorded, A_PCK on which audio data is recorded, and SP_PCK on which sub-picture data is recorded, together with NV_PCK which is navigation data, is recorded. On the NV_PCK, attributes for controlling the reproduction of the VOBU on which the NV_PCK is recorded and data used for searching and seamless reproduction (such reproduction that video is not intermittent) are recorded. At the time of special reproduction such as fast forward reproduction and backward reproduction of video, for example, reproduction control is carried out while obtaining an address representing the VOBU to be subsequently reproduced with reference to the NV_PCK.

Reference numeral 2 denotes an optical pickup serving as read-out means for reading out the recorded data from the optical disk 1. Reference numeral 3 denotes an RF amplifier for amplifying and outputting a signal from the optical pickup 2 as well as generating a tracking error signal and a focus error signal. Reference numeral 4 denotes a motor comprising a turn table and rotating the optical disk 1.

Reference numeral 5 denotes a driving circuit for carrying out focusing, tracking, and threading control in the optical pickup 2 and driving control of the motor 4. Reference numeral 6 denotes a DSP (Digital Signal Processor) servo circuit for outputting the signal read out of the optical disk 1 as digital data (a bit stream) as well as controlling the driving circuit 5 to carry out various types of servo control in response to the output signal from the RF amplifier 3.

Reference numeral 7 denotes a DVD decoder (decoding means) for performing demodulation corresponding to 8/16 modulation of the digital data outputted from the DSP servo circuit 6 and carrying out buffering control to a memory, described later, and decoding processing such as ECC and EDC processing of buffered data.

The DVD decoder 7 comprises an ECC block synchronous detection circuit 71 for detecting a timing signal (a synchronizing signal) of an ECC block which is a unit for performing decoding processing, an ECC/EDC processing circuit 72 for performing ECC and EDC processing of buffered data in the ECC block, an NV_PCK detection circuit (navigation sector detection means) 73 for detecting and outputting a sector which is NV_PCK out of sectors included in the data in the ECC block which has been subjected to the ECC and EDC processing, and a memory control circuit 74 for controlling writing and read-out of the data to and from the memory, described later. The DVD decoder 7 suitably outputs data in each pack, i.e., presentation data and navigation data which are subjected to the decoding processing selectively on the basis of control carried out by a control circuit 14, described later.

Reference numeral 8 denotes a video decoder for decoding video data which is outputted from the DVD decoder 7 and is compressed using an MPEG (Motion Picture Expert Group) format, for example, and outputting a video signal. Reference numeral 9 denotes a sub-picture decoder for receiving data related to a sub-picture by the control carried out by the control circuit 14, described later, decoding the inputted data, and outputting the decoded data as a video signal. Reference numeral 10 denotes an audio decoder for decoding audio data which is outputted from the DVD decoder 7 and is compressed using an MPEG and an AC-3 system to an audio signal.

The audio decoder 10 contains a digital-to-analog (D/A) converter, and converts the audio data obtained by the decoding into an analog audio signal, and then outputs the analog audio signal to acoustic equipment (not shown). Used as the audio decoder 10 may be one containing no D/A converter. In this case, a D/A converter may be arranged in the succeeding stage of the audio decoder 10.

Reference numeral 11 denotes a mixer for mixing the video signals which are respectively outputted from the video decoder 8 and the sub-picture decoder 9 and outputting an obtained video signal. The video signal outputted from the mixer 11 is fed to a display (not shown) so that display based on the video signal is performed. The mixer 11 may, in some cases, synthesize an on screen display (OSD) signal generated as required in accordance with the control carried out by the control circuit 14, described later, and the video signal.

Reference numeral 12 denotes a number-of sectors detection circuit (number-of-sectors detection means) for detecting the number of sectors which are NV_PCK included in one ECC block upon receipt of an output from the NV_PCK detection circuit 73 in the DVD decoder 7. Reference numeral 13 denotes a memory used when the data read out of the optical disk 1 is buffered and is subjected to decoding processing such as ECC and EDC processing. The memory 13 is also used for reproduction control processing of the control circuit 14, described later.

Reference numeral 14 denotes a control circuit (control means) for controlling the whole device. The control circuit 14 carries out control of read-out of data from the optical disk 1, control of decoding in the DVD decoder 7 and selection of output data, a control operation in the RF amplifier 3 and the DSP servo circuit 6 and factor setting therefor, control of a decoding operation in the video decoder 8 and the sub-picture decoder 9, display control including OSD control in the mixer 11, and so forth.

Reference numeral 15 denotes an input device for a user issuing a control instruction to the control circuit 14. The input device 15 is comprised of a plurality of keys, for example. Used as the input device 15 may be one for receiving a signal from a remote control as well as decoding the signal and feeding the decoded signal to the control circuit 14 as an input instruction signal.

In such a device, reproduction of video and audio from the optical disk 1 is performed in the following manner.

First in a state where the optical disk 1 is mounted on the reproducer, the control circuit 14 starts to read out a program (a bit stream) from the optical disk 1. That is, the optical disk 1 is rotated by the motor 4 under the control of the DSP servo circuit 6. While focusing, tracking and threading control of the optical pickup 2 is carried out, a signal corresponding to data recorded by the optical pickup 2 from the optical disk 1 is detected. Digital data (a bit stream) corresponding to the detected signal is inputted to the DVD decoder 7.

In the DVD decoder 7, the read digital data (the bit stream) is demodulated (subjected to demodulation corresponding to 8/16 modulation), and is subjected to ECC and EDC processing for each ECC block, so that data representing NV_PCK is fed to the control circuit 14 from the memory 13 or the DVD decoder 7. The control circuit 14 suitably outputs navigation data to any one of the decoders 8, 9, 10 corresponding thereto on the basis of the data representing NV_PCK.

In the video decoder 8, the video data is decoded to output the video signal under the control of the control circuit 14. In the sub-picture decoder 9, the data related to the sub-picture is decoded depending on an instruction to display the sub-picture and an instruction to select a language for displaying the sub-picture from the control circuit 14, to output the video signal representing the sub-picture such that video represented by sub-picture data corresponding to the selected language (for example, English) is displayed at a position represented by positional information.

The video signal outputted from the video decoder 8 and the video signal outputted from the sub-picture decoder 9 are mixed and synthesized in the mixer 11, and are outputted as one video signal. On the display to which the video signal from the mixer 11 is inputted, video obtained by synthesizing video corresponding to the selected sub-picture with video corresponding to the video data is reproduced and displayed.

Furthermore, the audio data inputted to the audio decoder 10 is decoded to an audio signal, and the audio signal is fed to the acoustic equipment (not shown) so that audio based on the audio data is reproduced and outputted.

Figure 3:
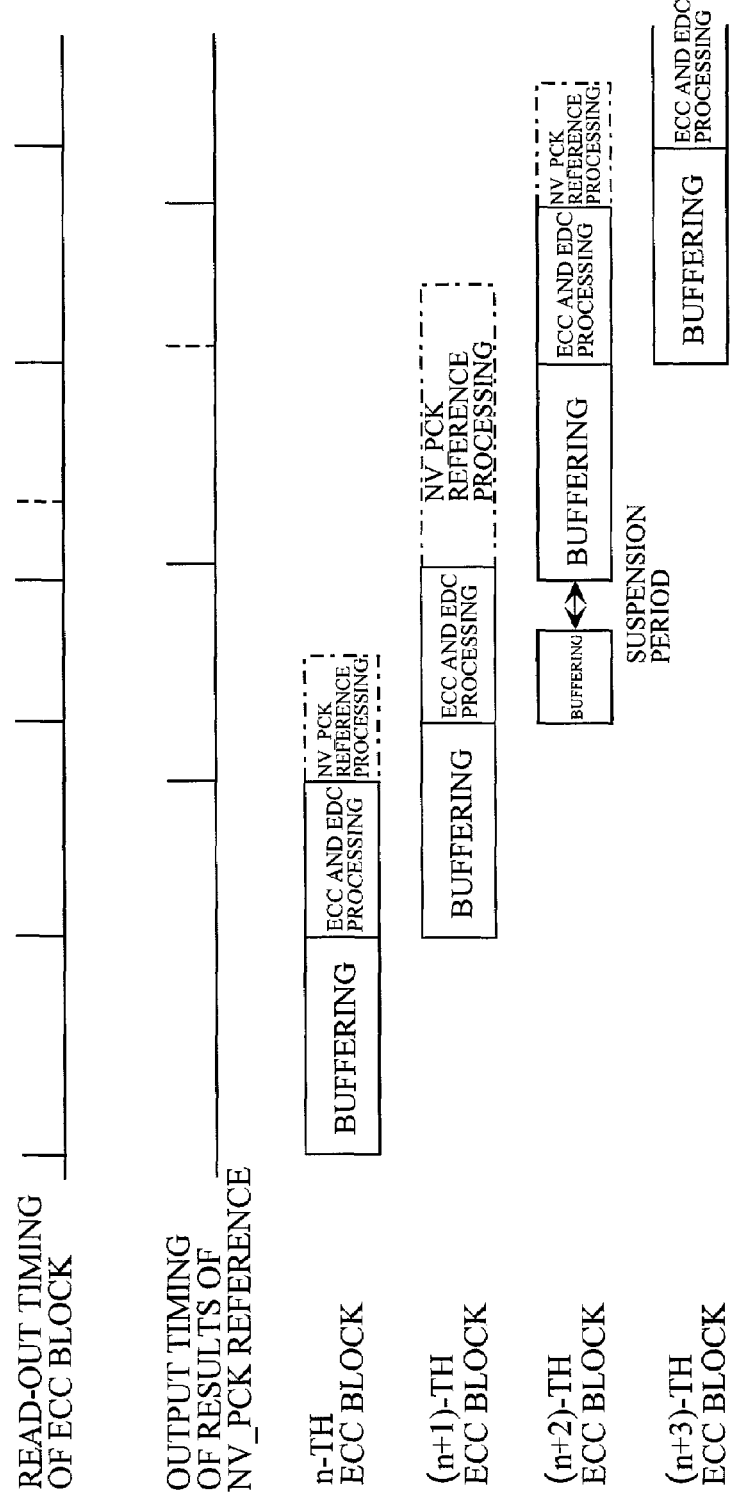
FIG. 3 is a timing chart for explaining decoding processing according to an embodiment of the present invention.

Referring to FIG. 3, decoding processing of data read out of the optical disk 1 will be described.

First, the data read out of the optical disk 1 by the optical pickup 2 is inputted to the DVD decoder 7 through the DSP servo circuit 6. In the DVD decoder 7, a synchronous code in an ECC block which is a unit in performing decoding processing is detected by the ECC block synchronous detection circuit 71 (i.e., the head of the ECC block is detected), and data in the ECC block is buffered in the memory 13. For example, when the buffering of the n-th ECC block in the memory 13 is terminated, the control circuit 14 buffers the (n+1)-th ECC block in a different region of the memory 13.

After ECC and EDC processing is performed by the ECC/EDC processing circuit 72 subsequently to the buffering of the n-th ECC block, the NV_PCK detection circuit 73 detects which of 16 sectors in the n-th ECC block is NV_PCK. For example, the NV_PCK detection circuit 73 sets, for each of the sectors, a flag "1" in the sector which is NV_PCK and sets a flag "0" in the sector which is not NV_PCK (sets data), as shown in FIG. 4, and outputs the results thereof to the number-of-sectors detection circuit 12.

The number-of-sectors detection circuit 12 counts the number of flags "1", to detect the number of sectors which are NV_PCK included in the n-th ECC block and output the detected number of sectors to the control circuit 14.

The control circuit 14 receives the number of sectors which are NV_PCK at timing almost simultaneously with or slightly delayed from the termination of the decoding processing, and then starts NV_PCK reference processing by receiving the termination of the decoding processing. The reference processing is performed by reading out data representing NV_PCK from the memory 13. Further, the control circuit 14 judges whether or not the inputted number of sectors which are NV_PCK is larger than a predetermined value, to suspend buffering of the subsequent ECC block, as described later, if the number of sectors is larger than the predetermined value, while continuing the buffering of the subsequent ECC block as it is when the number of sectors is not larger than the predetermined value.

In the example shown in FIG. 3, the number of sectors which are NV_PCK included in the n-th ECC block shall not be larger than the predetermined value, to perform reference processing of NV_PCK in the n-th ECC block while continuing the buffering of the (n+1)-th ECC block. When the reference processing of NV_PCK in the n-th ECC block is terminated, presentation data (video and audio) is reproduced and outputted in accordance with set reproduction control. Presentation data in the n-th ECC block is not reproduced to reproduce the other VOBU depending on the set state of a reproduction operation such as fast forwarding.

When the buffering of the (n+1)-th ECC block is terminated, the control circuit 14 performs ECC and EDC processing of the (n+1)-th ECC block, as in the foregoing, and starts buffering of the (n+2)-th ECC block in the memory 13 (an empty region of the memory 13 and a region storing data which has been subjected to decoding and reproduction processing).

When the ECC and EDC processing of the (n+1)-th ECC block by the ECC/EDC processing circuit 72 in the DVD decoder 7 and the detection of the sectors which are NV_PCK by the NV_PCK detection circuit 73 are terminated, and the number of sectors which are NV_PCK included in the (n+1)-th ECC block is outputted to the control circuit 14 from the number-of-sectors detection circuit 12, the control circuit 14 starts reference processing of NV_PCK in the (n+1)-th ECC block. Further, it is also judged whether or not the inputted number of sectors which are NV_PCK is larger than the predetermined value.

When it is assumed that the number of sectors which are NV_PCK included in the (n+1)-th ECC block shown in FIG. 3 is larger than the predetermined value, the control circuit 14 judges that the number of sectors which are NV_PCK included in the (n+1)-th ECC block is larger than the predetermined value, to suspend the buffering of the subsequent (n+2)-th ECC block.

The buffering is suspended by the control circuit 14 instructing the DVD decoder 7 to stop the buffering of the (n+2)-th ECC block and further instructing the DSP servo circuit 6 to back-jump a track position on the optical disk 1 by one track (one groove in the optical disk), to seek the head of the (n+2)-th ECC block. Consequently, the buffering of the (n+2)-th ECC block is suspended by approximately a time period required to rotate the optical disk 1 once. During the time period, the reference processing of NV_PCK in the (n+1)-th ECC block is terminated, to carry out reproduction control conforming to a set reproduction operation.

When the head of the (n+2)-th ECC block is sought, the buffering of the (n+2)-th ECC block is started again. Although the buffering of the (n+2)-th ECC block is performed from the beginning of data in the ECC block at this time, the present invention is not limited to the same. Data subsequent to the data buffered in the memory 13 may be subsequently buffered before the buffering is suspended, for example.

When the buffering of the (n+2)-th ECC block is terminated, buffering of the (n+3)-th ECC block is started in the same manner as described above. Accordingly, ECC and EDC processing of the (n+2)-th ECC block, detection processing of sectors which are NV_PCK in the (n+2)-th ECC block, and reference processing of NV_PCK in the (n+2)-th ECC block are performed.

When the reproduction of the (n+2)-th ECC block is not required by the reference processing of NV_PCK in the (n+1)-th ECC block, the control circuit 14 stops the buffering of the (n+2)-th ECC block, and assigns an address to be sought to the DSP servo circuit 6 in order to read out and reproduce a new ECC block, to buffer a suitable ECC block.

When the reference processing of NV_PCK in the ECC block is not terminated within a time period required to buffer the subsequent ECC block, the buffering of the subsequent ECC block is suspended, thereby making it possible to perform reference processing of NV_PCK in the subsequent ECC block subsequently to ECC and EDC processing. Consequently, the decoding processing is performed using pipeline processing without a delay on the memory, thereby making it possible to eliminate such inconvenience that reproduced video is intermittent and video is not formed. Further, a control circuit which is high in processing speed and is relatively high in cost need not be used, thereby not increasing the cost of the device.

Description is now made of the setting of a predetermined value used for judgment in suspending the buffering of the subsequent ECC block.

First, let Tr be a time period required to perform reference processing of one NV_PCK. Used as Tr is the average value, the most frequent value, or the maximum value of a time period required to perform reference processing of a plurality of packs NV_PCK.

Let Tp be a time period required to buffer one ECC block. Tp almost corresponds to a time period required to read out one ECC block from the optical disk. Tp depends on a reproduction speed (a read-out speed of data from the optical disk 1), which is approximately 23 milliseconds at the time of a speed which is one time its standard speed and 11.5 milliseconds at the time of a speed which is two times its standard speed.

The number of packs NV_PCK which can be referred to within the time period Tp is Tp/Tr. Consequently, a predetermined value used for judgment in suspending buffering of the subsequent ECC block is an integer which does not exceed Tp/Tr. That is, when the number of sectors which are NV_PCK in one ECC block is larger than the predetermined value, the control circuit 14 considers that NV_PCK reference processing cannot be terminated within the time period Tp, to suspend the buffering of the subsequent ECC block.

The predetermined value may be stored in the memory as several constants corresponding to the time period Tp, or may be calculated in conformity with the time period Tp.

Although in the present embodiment, the buffering of the ECC block is suspended by back-jumping the track position on the optical disk 1 which is read out by the optical pickup 2 by one track (one groove in the optical disk), for example, the present invention is not limited to the same. The track position may be back-jumped by a plurality of tracks depending on a required suspension time period, for example, or the read-out operation may be stopped for a predetermined time period.

Although the number-of-sectors detection circuit 12 counts flag data outputted from the NV_PCK detection circuit 73 to detect the number of packs NV_PCK, the present invention is not limited to the same. For example, the number of packs NV_PCK may be directly detected from the results of the decoding by the DVD decoder.

In the present invention, as apparent from the foregoing description, when the number of sectors which are NV_PCK in the ECC block is larger than the predetermined value, it is judged that NV_PCK reference processing is not terminated within a time period required to buffer the subsequent ECC block, to suspend the buffering of the subsequent ECC block. Accordingly, reference processing of NV_PCK in the subsequent ECC block can be performed subsequently to ECC and EDC processing, so that decoding processing is performed using pipeline processing without a delay on the memory. Consequently, there can be provided an optical disk reproducer capable of continuously performing decoding processing in VOBU units without a delay and performing DVD decoding reproduction which is synchronized with VOBU processing.

Furthermore, it is possible to stably omit unnecessary decoding processing of VOBU in performing special reproduction such as interleaving reproduction or fast forward reproduction.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. An optical disk reproducer, comprising read-out means for reading outs from an optical disk having presentation and navigation data recorded thereon, a memory storing the data read-out means, and decoding means the data stored in the memory in a predetermined unit, for performing reproduction based on the presentation data, comprising number-of-sectors detection means for detecting the number sectors which are the navigation data included data the predetermined stored in said memory; and control means for suspending, when the number of sectors detected by the number-of-sectors detection means larger than a predetermined value, an operation for storing in said memory data in the subsequent predetermined unit.

2. The optical disk reproducer according to claim 1, characterized in that said control means suspends the read-out from the optical disk by the read-out means and back-jumps track position on the optical disk, to suspend the operation for storing in said memory the data in the predetermined unit.

3. The optical disk reproducer according to claim 1, wherein said decoding means comprises navigation sector detection means for detecting the navigation data included in the data the predetermined unit stored in said memory to specify which of sectors is the navigation data, and said number-of-sectors detection means counts the number of sectors which are the navigation data specified by said navigation sector detection means.

4. The optical disk reproducer according to claim 2, wherein said decoding means comprises navigation sector detection means for detecting the navigation data included in the data in the predetermined unit stored in said memory to specify which of the sectors is the navigation data, and said number-of-sectors detection means counts the number of sectors which are the navigation data specified by said navigation sector detection means.

5. The optical disk reproducer according to claim 1, wherein the optical disk conforms to a DVD standard, and the navigation data is NV_PCK.

6. The optical disk reproducer according to claim 2, wherein the optical disk conforms to a DVD standard, and the navigation data is NV_PCK.

7. The optical disk reproducer according to claim 3, wherein the optical disk conforms to a DVD standard, and the navigation data is NV_PCK.

8. The optical disk reproducer according to claim 4, wherein the optical disk conforms to a DVD standard, and the navigation data is NV_PCK.

* * * * *